(12) United States Patent
D'Alessio

(10) Patent No.: US 11,150,439 B2
(45) Date of Patent: Oct. 19, 2021

(54) BI-METAL OPTICAL MOUNT

(71) Applicant: Thorlabs, Inc., Newton, NJ (US)

(72) Inventor: Brett D'Alessio, Califon, NJ (US)

(73) Assignee: Thorlabs, Inc., Newton, NJ (US)

( * ) Notice: Subject to any disclaimer, the term of this patent is extended or adjusted under 35 U.S.C. 154(b) by 189 days.

(21) Appl. No.: 16/519,458

(22) Filed: Jul. 23, 2019

(65) Prior Publication Data

US 2020/0026028 A1    Jan. 23, 2020

Related U.S. Application Data

(60) Provisional application No. 62/702,003, filed on Jul. 23, 2018.

(51) Int. Cl.
   *G02B 7/192* (2021.01)
   *G02B 7/18* (2021.01)
   *G02B 7/182* (2021.01)

(52) U.S. Cl.
   CPC .......... *G02B 7/181* (2013.01); *G02B 7/1828* (2013.01); *G02B 7/192* (2013.01)

(58) Field of Classification Search
   CPC ...... G02B 7/181; G02B 7/192; G02B 7/1828; G02B 7/028; G02B 7/008
   USPC ........................................... 359/848
   See application file for complete search history.

(56) References Cited

U.S. PATENT DOCUMENTS

| | | | |
|---|---|---|---|
| 4,861,137 A | 8/1989 | Nagata | |
| 6,198,580 B1 * | 3/2001 | Dallakian | G02B 7/1824 |
| | | | 359/819 |
| 2014/0029010 A1 * | 1/2014 | Bleier | G02B 1/02 |
| | | | 359/848 |

OTHER PUBLICATIONS

Cabatic, Sherwin D. et al., "Optical Mounting: Choosing the right optical mount. Selecting a mount for either manufacturing or laboratory use requires balancing size, ease-of-use, performance, and cost.", Laser Focus World, Jan. 1, 2000, Fig 2,3.
International Search Report and written opinion issued by the International Searching Authority for corresponding International Patent Application No. PCT/US2019/043012, dated Oct. 24, 2019.

* cited by examiner

*Primary Examiner* — Euncha P Cherry
(74) *Attorney, Agent, or Firm* — Myers Wolin, LLC

(57) ABSTRACT

An optomechanical device having an interface that is mounted to another interface wherein the two interfaces are made of materials having the same or similar coefficients of thermal expansion and within the optomechanical device is an interface that is designed to compensate for the second mechanical component that is made of materials having the same or similar coefficients of thermal expansion as the optic or photonic device or instrument being held or controlled altogether with a fully constrained set of slip planes making for an optical mechanical device consisting of two or more materials that have coefficients of thermal expansion that are suitably matched to the materials it is being mounted to and the materials it is holding or controlling.

13 Claims, 7 Drawing Sheets

BI-METAL OPTICAL MOUNT

CROSS REFERENCE TO RELATED APPLICATIONS

This application claims the benefit of U.S. Provisional Patent Application No. 62/702,003 filed on Jul. 23, 2018. The disclosures of U.S. Provisional Patent Application No. 62/702,003 are hereby incorporated by reference.

FIELD OF THE INVENTION

The present invention relates to optical mounts generally, and more specifically to optical mounting elements configured to provide improved beam pointing stability and improved wave front distortion performance.

BACKGROUND

As shown in FIG. 1, a typical kinematic optical mount is made from an aluminum frame with brass bushings and stainless steel adjuster screws or of a stainless steel frame 100 with brass bushings 110 and stainless steel adjuster screws 120. The optical mounts are then screwed onto either an aluminum base or a stainless steel base 130 where the material choice for the base is not necessarily the same as the optical mount. The aluminum or stainless steel optic cell 140 is held onto the tips of the adjuster screws with springs where the material choice for the optic cell is of the same material as the frame. The glass optic 150 is clamped into the optic cell 140 using a set screw. FIG. 2 shows a typical aluminum or stainless steel fixed mirror mount 160 holding a glass optic 170 and screwed onto either an aluminum base or a stainless steel base 130. The problem here is that as the temperature changes the two different materials with different coefficients of thermal expansion (CTE) will expand and contract at different rates. This un-uniform change in geometric shape will cause stress to build up between the two parts. As this happens it causes the contact surfaces of these parts to develop stress that result in strain on the mechanical components. As this strain builds up the physical shape of the matting surfaces begin to expand, but at different rates causing a slip and grip movement. These contact areas with varying CTEs create slip planes. The greater the difference in coefficients of thermal expansion between the two materials the greater the movement in the slip plane between the two parts. This slip between the two parts will cause movement in the system, thus compromising the long term beam pointing stability of the optical mount.

The system that is made from materials with dissimilar CTE is also susceptible to contact plane rocking or the changing of contact points as the contact regions expand or contract at different rates. This would be of concern when two materials that have dissimilar coefficients of thermal expansion are held together or squeezed together as they would in the mechanical union of a screwed joint or a press fit bond. Having materials with matched coefficients of thermal expansion at these contact regions would significantly reduce this effect.

The same problem also exists between the optics and the optical lens cells. These two materials having different coefficients of thermal expansion will also develop stress as they are exposed to temperature changes. The stress will develop unwanted optical distortion, pitching of the optic, an unwanted slip plane or even cause the optic to shatter if too much stress builds up.

SUMMARY

An embodiment of the present invention that matches material coefficients of thermal expansion where possible and provides kinematic slip planes where needed to allow for thermal expansion of materials and also provide precision location of components. This embodiment significantly reduces the strain in an opto-mechanical system providing for much higher levels of system thermal stability. A system with fully constrained kinematic slip planes between the components that do not have matched coefficients of thermal expansion to prevent stress buildup between these units, and consisting of components with matched coefficient of thermal expansion such as the optic mount frame and base, and the optic cell and optic to prevent stress buildup between these units. The controlling of thermal induced stress in the system will result in a system that has little or no strain and provide for a very stable optical system.

One embodiment of the present invention provides an optical mount that is made from materials that have different coefficients of thermal expansion including an optic cell that holds an optic; wherein the optic cell is made from a material that has a thermal expansion the matches or substantially matches the thermal expansion of the optic, to prevent stress formation between the optic cell and optic during thermal changes; and wherein the frame of the optic mount is made from a material that has a thermal expansion the matches or substantially matches the thermal expansion of the structure to which the optical mount frame is mounted, to prevent stress formation between the optic mount frame and the structure during thermal changes, wherein the optical mount further comprising slip planes between the optic cell and the optic mount frame, wherein the slip planes allow the optic cell to expand and contract at different rates and magnitudes with respect to the optic mount frame without the buildup of stress between the optic cell and optic mount frame, and with a minimal change in position about a centroid of the movement.

DETAILED DESCRIPTION OF THE PREFERRED EMBODIMENTS

Figure 1:
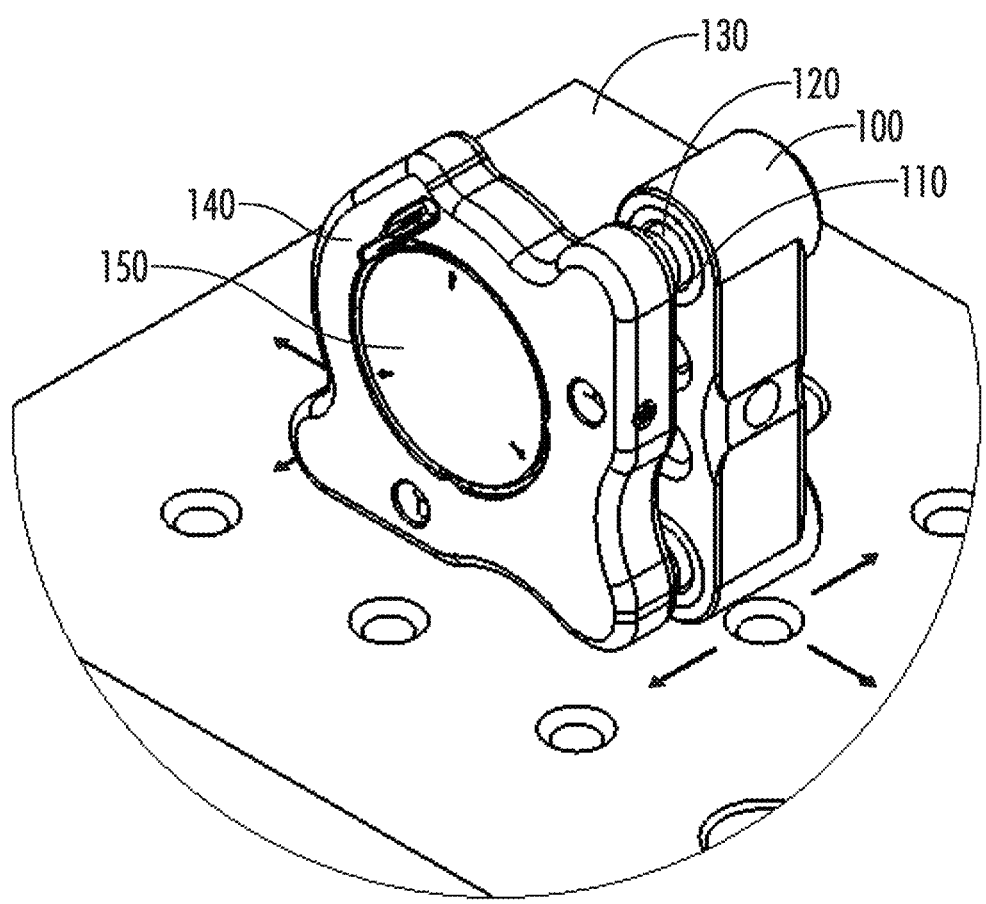
FIG. 1 is a typical kinematic optical mount.
Figure 2:
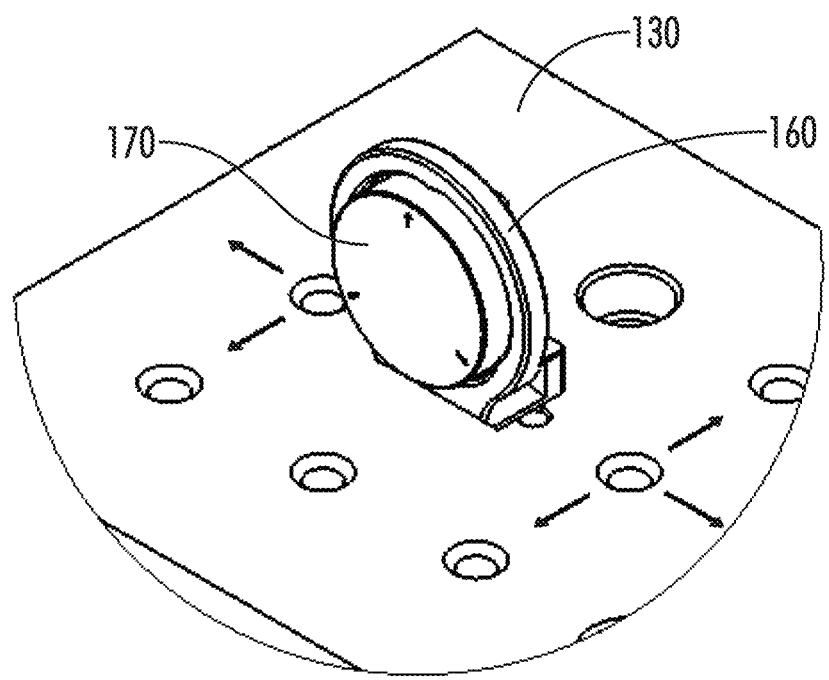
FIG. 2 is a typical fixed mirror mount.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Figure 3:
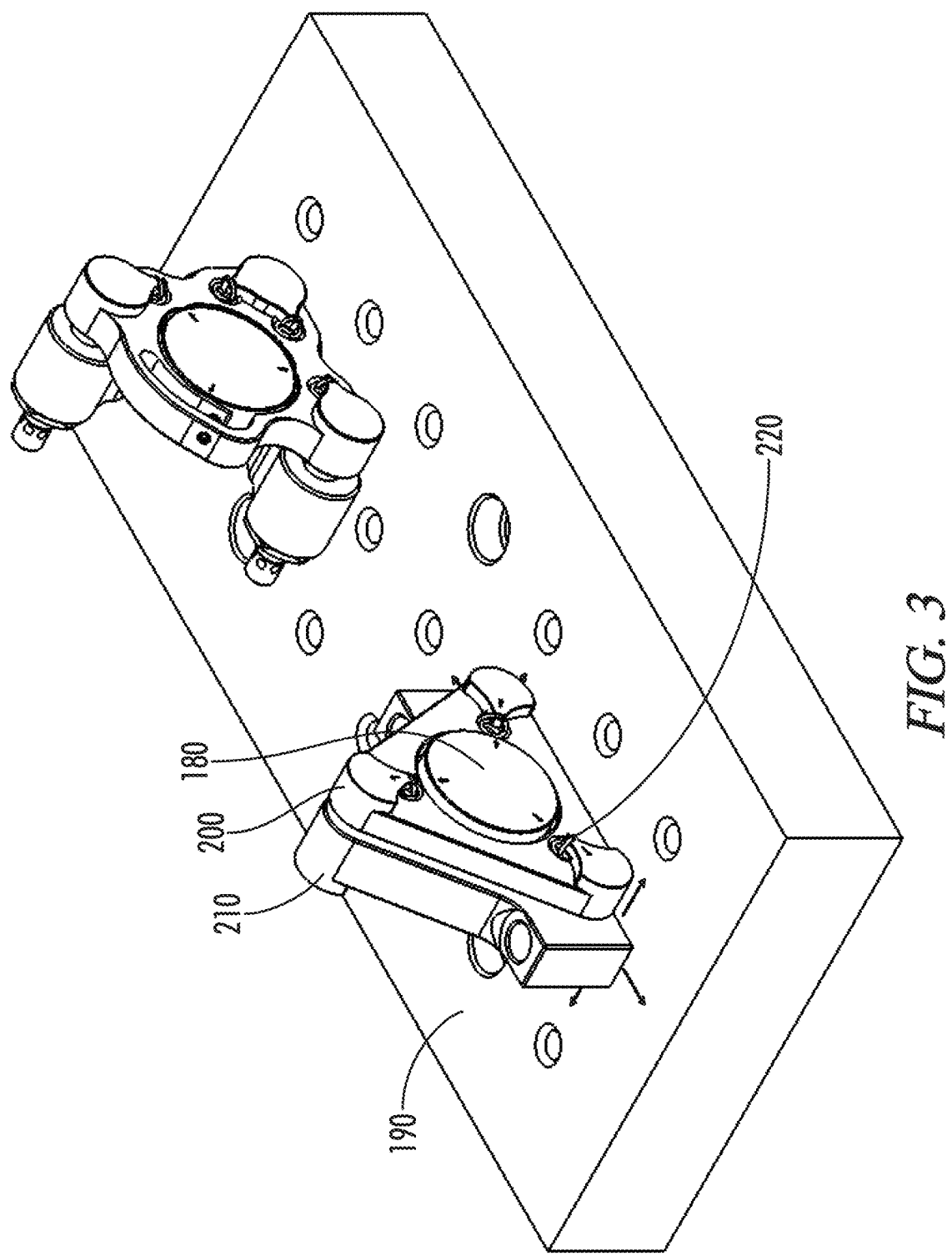
FIG. 3 is an isometric view of a fixed bi-metal mount and a kinematic bi-metal mount according to an embodiment with base plate and optics shown.
Figure 4:
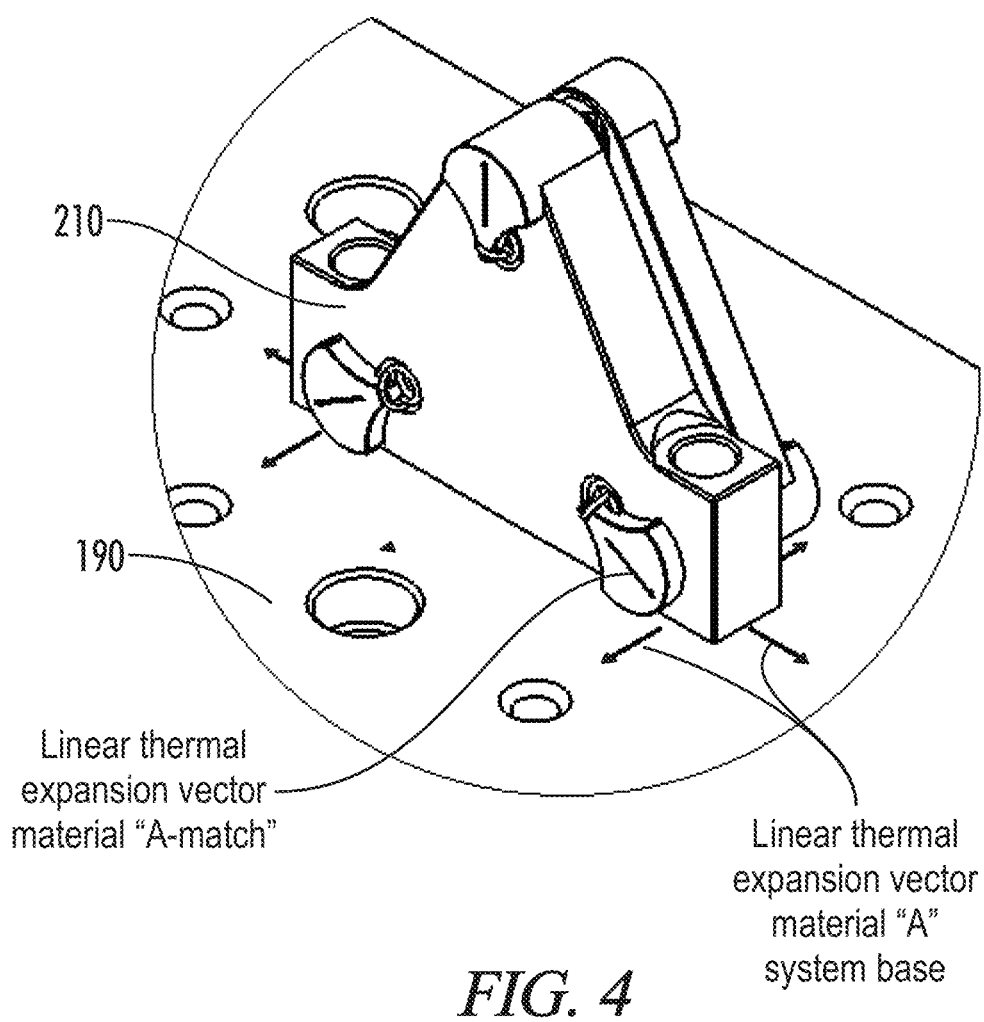
FIG. 4 is an isometric view of fixed a bi-metal mount according to an embodiment with thermal expansion vectors shown.
Figure 5:
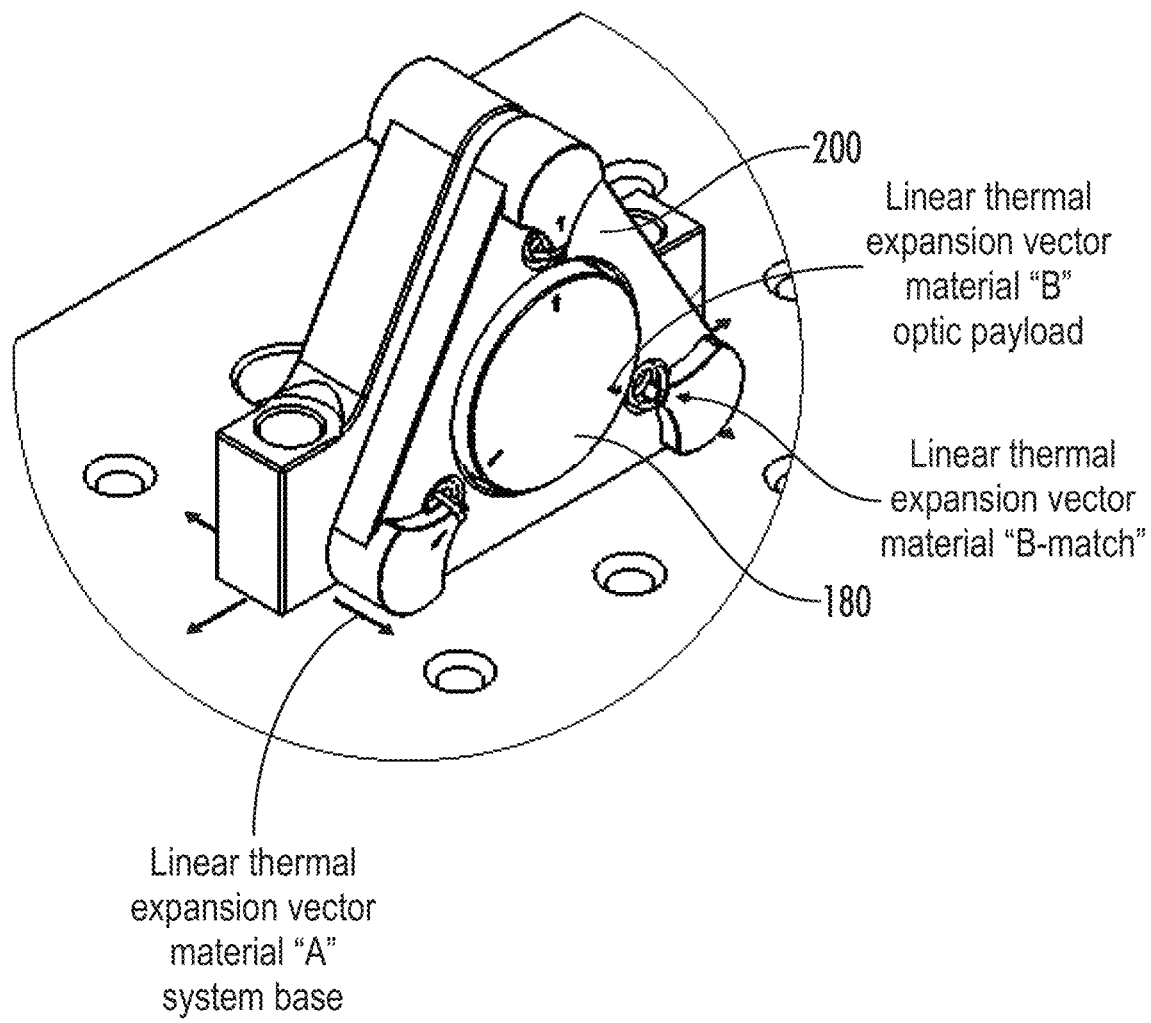
FIG. 5 is an isometric view of a kinematic bi-metal mount according to an embodiment with thermal expansion vectors shown.

In an embodiment of the present invention as shown in FIG. 3, a typical fused silica glass optic 180 with a CTE of $0.4 \times 10^{-6}/^\circ$ C. was to be held into a typical laser system made from MIC 6® aluminum cast plate 190 with a CTE of $23.6 \times 10^{-6}/^\circ$ C., the fused silica glass optic 180 would be mated to a optic cell 200 made from Invar36 that has a CTE of $0.52 \times 10^{-6}/^\circ$ C. and the base of the optic mount 210 would be made from MIC 6® aluminum cast plate with a CTE of $23.6 \times 10^{-6}/^\circ$ C. The springs 220 hold the optic cell and optic mount together. This system would result in very little stress build up between the optic and the optic cell and the optic mount frame and the base over temperature change, but a high stress build up between the optic cell 200 and the optic mount frame 210. FIG. 4 and FIG. 5 show a graphical representation of the linear thermal expansion vector magnitudes for each material. As can been seen from FIG. 4 and FIG. 5 the linear thermal expansion vector magnitudes of the optic 180 and the optic cell 200 are substantially matched (CTE $0.4 \times 10^{-6}/^\circ$ C. vs. $0.52 \times 10^{-6}/^\circ$ C.), and the linear thermal expansion vector magnitudes of the optic mount frame 210 and the base 180 are matched (CTE $23.6 \times 10^{-6}/^\circ$ C. vs. $23.6 \times 10^{-6}/^\circ$ C.). However, the linear thermal expansion vector magnitudes of the optic cell 200 and optic mount frame 210 are of about 1-2 order of magnitude in difference (CTE $0.52 \times 10^{-6}/^\circ$ C. vs. $23.6 \times 10^{-6}/^\circ$ C.).

Figure 6:
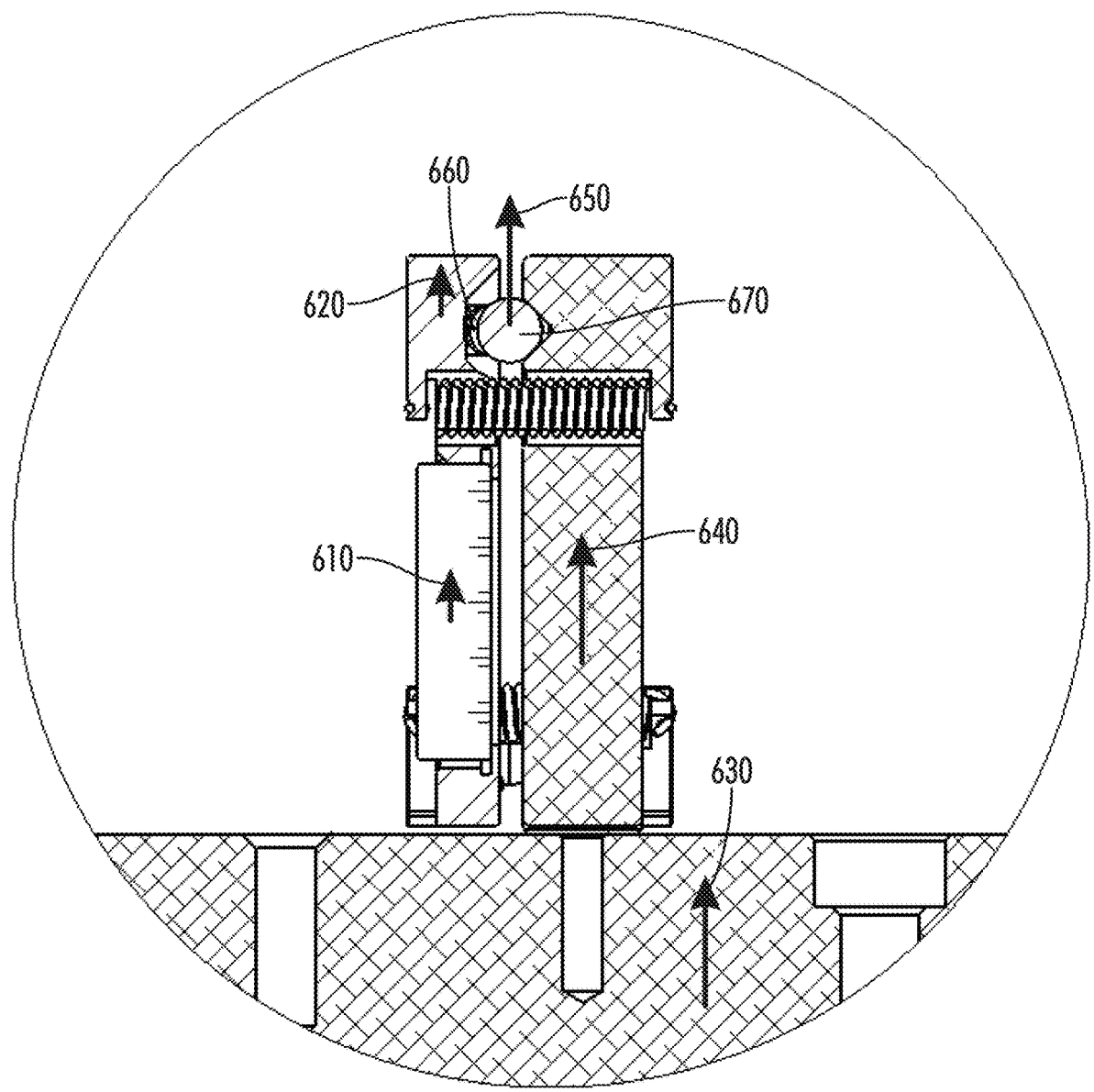
FIG. 6 is a sectional view of fixed a bi-metal mount for better clarity of the slip plains, according to an embodiment. Thermal expansion vectors are also shown.

In an embodiment of the present invention the optic cell and the optic mount frames are held together using a slip plane that prevents the accumulation of stress buildup during temperature changes while maintaining the relative position of each component. This would result in very little movement of the optic with relation to the base plate it is mounted to. This can be seen in FIG. 6 that shows the linear thermal expansion vectors of the matched materials and the controlled slip plane between them. Just like FIGS. 4 and 5, FIG. 6 shows that the optic has a linear thermal expansion vector material "B" for optic payload 610, which is matched or substantially matched by a linear thermal expansion vector material "B-Match" of the optic cell 620, and that the system base has a thermal expansion vector material "A"630, which is matched or substantially matched by a thermal expansion vector material "A-Match" of the optic mount frame 640. Without loss of generality, FIG. 6 shows the optic and the optic cell have a small vector 610, 620, and the base and the optic mount frame have a large vector 630, 640. A ball bearing shown in FIG. 6 is provided to prevent stress buildup between the optic cell and the optic mount frame. The ball bearing has a large vector bearing surface 670 that makes contact with the optic mount frame. The linear thermal expansion vector material "A-Match" of the ball bearing 650 is matched or substantially matched with that of the optic mount frame 640. The ball bearing has a small vector bearing surface 650 that makes contact with the optic cell. During thermal expansion or contraction, the ball bearing allows the optic mount frame and optic cell to slip relative to each other.

The materials mentioned above are one example of material combinations, but many more combinations are possible to either provide for a better CTE match or to allow for a better CTE-to-cost compromise. If a borosilicate glass, such as a BK7 glass optic, with a CTE of $7.1 \times 10^{-6}/^\circ$ C. was to be used the optic cell Kovar with a CTE of $5 \times 10^{-6}/^\circ$ C. could be used for the optic cell.

Figure 7:
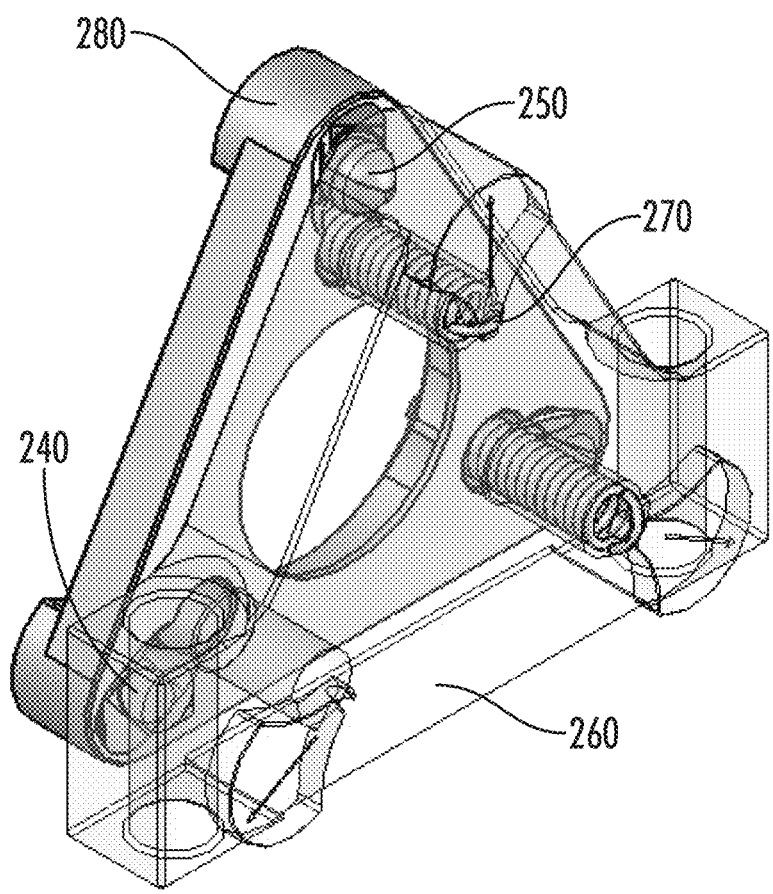
FIG. 7 is an isometric view of a fixed bi-metal mount according to an embodiment with a transparent back plate, one spring removed and two balls removed for better clarity of the slip plains.

FIG. 7 shows a graphical representation of a set of kinematic slip planes 240 typical 6 places that constrain the location of the components that have different coefficients of thermal expansion while still allowing them to physically expand and contract at different rates, and with a minimal change in position about a centroid of the movement. The one ball bearing 250 typical 3 places contacts a set of the kinematic slip planes, the other two ball bearings were removed for better clarity. The optic mount frame 260 has been made transparent for better clarity. The springs 270 typical 3 places apply force to hold the kinematic constrained slip planes together of the optic mount frame and the optic cell 280, one spring was removed for better clarity. This view shows a fixed kinematic system using point ball contacts, but a shaft could also be used to create a line contact to provide a fully restrained slip plane. The slip plane contact areas would be made from materials that would provide for a low coefficient of friction to allow for a smooth movement during thermal expansion or contraction, a thin layer of grease or a low friction coating might be applied at these areas.

Some example slip plane configurations according some embodiments include: the optic cell and the optic mount frame are held in contact with six smooth slip planes that allow for stress free thermal expansion with little or no strain; the optic cell and the optic mount frame are held in contact with one fixed contact, and three additional slip planes that allow for stress free thermal expansion with little or no movement of the optical element; the optic cell and the optical mount frame are held in contact with six smooth slip planes that allow for stress free thermal expansion with little or no movement of the optical element; the optic cell and the optical mount frame are held in contact with one fixed contact, and three additional slip planes that allow for stress free thermal expansion with little or no movement of the optical element; including six smooth slip planes that are orientated to allow movement about the centroid of the optic to allow the centroid to remain fixed or experience very little change in position when exposed to thermal changes; including six smooth slip planes that are orientated to allow movement about the any single point within to allow that point to remain fixed or experience very little change in position when exposed to thermal changes; including six smooth slip planes that have a force loading mechanism to create a controlled force to hold the contact points against the slip planes, wherein the force loading mechanism is selected from a group that comprises: a spring, springs and magnets; including six smooth slip planes that are in pairs of two to form three V-grooves; including six smooth slip planes that are located independently; including three smooth slip planes that are located in one fixed three-plane contact set, one two-plane contact set and a single-plane contact allowing thermal expansion along the three planes of contact; including three smooth slip planes that are located in one fixed-cone contact, one two-plane contact set and a single-plane contact allowing thermal expansion along the three planes of contact; and including six smooth slip planes that are located in one set of three, one set of two and a single plane.

While the present invention has been described at some length and with some particularity with respect to the several described embodiments, it is not intended that it should be limited to any such particulars or embodiments or any particular embodiment, but it is to be construed so as to provide the broadest possible interpretation in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. An optical mount comprising an optic mount frame, and an optic cell that holds an optic;
   wherein the optic cell is made from a material that has a thermal expansion that matches or substantially matches the thermal expansion of the optic, to prevent stress formation between the optic cell and optic during thermal changes; and
   wherein the optic mount frame is made from a material that has a thermal expansion the matches or substantially matches the thermal expansion of a structure to which the optical mount frame is mounted, to prevent stress formation between the optic mount frame and the structure during thermal changes,
   wherein the material that the optical cell is made from and the material that the optical mount is made from have different coefficients of thermal expansion;
   wherein the optical mount further comprising slip planes between the optic cell and the optic mount frame, wherein the slip planes allow the optic cell to expand and contract at different rates and magnitudes with respect to the optic mount frame without the buildup of stress between the optic cell and optic mount frame, and with a minimal change in position about a centroid of the movement.

2. The optical mount of claim 1, wherein the optic cell and the optic mount frame are held in contact with six smooth slip planes that allow for stress free thermal expansion with little or no strain.

3. The optical mount of claim 1, wherein the optic cell and the optic mount frame are held in contact with one fixed contact, and three additional slip planes that allow for stress free thermal expansion with little or no movement of the optical element.

4. The optical mount of claim 1, wherein the optic cell and the optical mount frame are held in contact with six smooth slip planes that allow for stress free thermal expansion with little or no movement of the optical element.

5. The optical mount of claim 1, wherein the optic cell and the optical mount frame are held in contact with one fixed contact, and three additional slip planes that allow for stress free thermal expansion with little or no movement of the optical element.

6. The optical mount of claim 1, further comprising six smooth slip planes that are orientated to allow movement about the centroid of the optic to allow the centroid to remain fixed or experience very little change in position when exposed to thermal changes.

7. The optical mount of claim 1, further comprising six smooth slip planes that are orientated to allow movement about the any single point within to allow that point to remain fixed or experience very little change in position when exposed to thermal changes.

8. The optical mount of claim 1, further comprising six smooth slip planes that have a force loading mechanism to create a controlled force to hold the contact points against the slip planes, wherein the force loading mechanism is selected from a group that comprises: a spring, springs and magnets.

9. The optical mount of claim 1, further comprising six smooth slip planes that are in pairs of two to form three V-grooves.

10. The optical mount of claim 1, further comprising six smooth slip planes that are located independently.

11. The optical mount of claim 1, further comprising three smooth slip planes that are located in one fixed three-plane contact set, one two-plane contact set and a single-plane contact allowing thermal expansion along the three planes of contact.

12. The optical mount of claim 1, further comprising three smooth slip planes that are located in one fixed-cone contact, one two-plane contact set and a single-plane contact allowing thermal expansion along the three planes of contact.

13. The optical mount of claim 1, further comprising six smooth slip planes that are located in one set of three, one set of two and a single plane.

* * * * *